July 18, 1967 | J. C. SPERY | 3,331,531

WRAPPER TYPE CARRIER

Filed Feb. 4, 1963 | 7 Sheets-Sheet 1

INVENTOR.
JOSEPH C. SPERY
BY Irving Seidman
ATTORNEY.

July 18, 1967 J. C. SPERY 3,331,531

WRAPPER TYPE CARRIER

Filed Feb. 4, 1963 7 Sheets-Sheet 2

INVENTOR.
JOSEPH C. SPERY
BY Irving Seidman
ATTORNEY.

July 18, 1967 J. C. SPERY 3,331,531
WRAPPER TYPE CARRIER
Filed Feb. 4, 1963 7 Sheets-Sheet 3
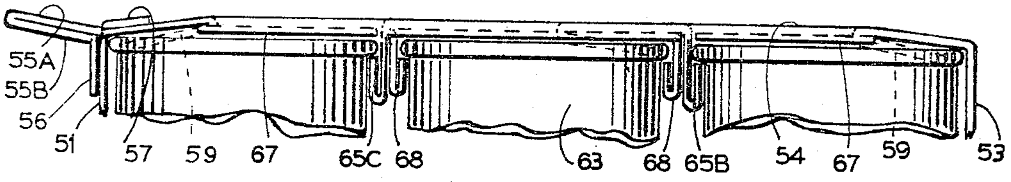
FIG. 4
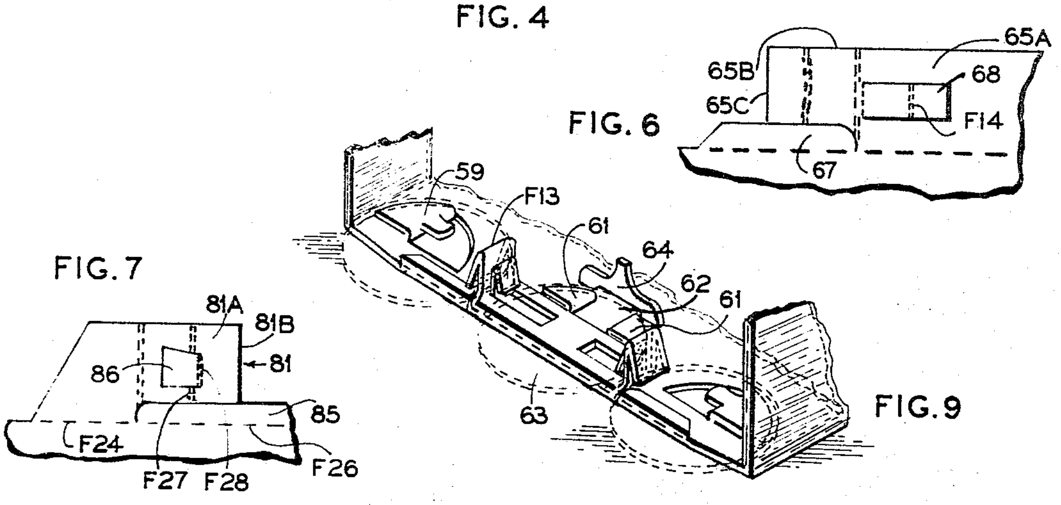
FIG. 6 FIG. 7 FIG. 9
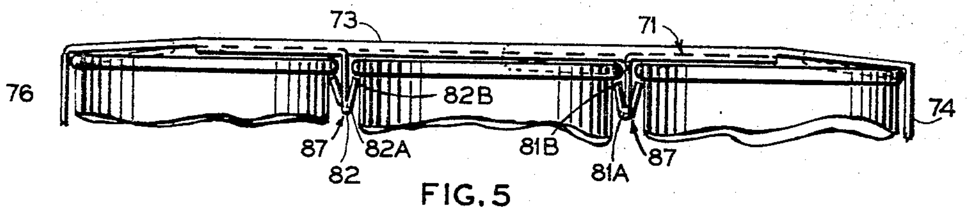
FIG. 5
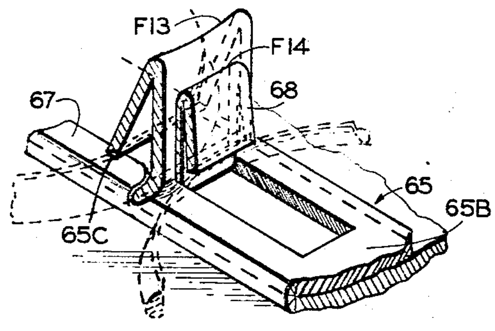
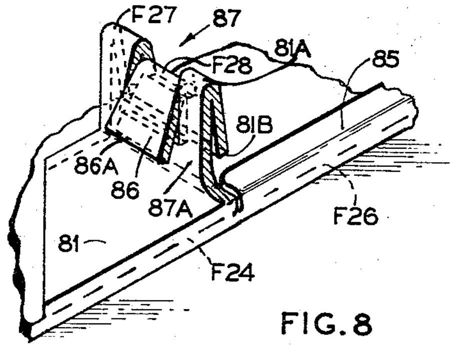
FIG. 8
FIG. 6A
INVENTOR.
JOSEPH C. SPERY
BY Irving Seidman
ATTORNEY.

INVENTOR.
JOSEPH C. SPERY
BY Irving Seidman
ATTORNEY.

WRAPPER TYPE CARRIER

Filed Feb. 4, 1963

INVENTOR.
JOSEPH C. SPERY
BY Irving Seidman
ATTORNEY.

July 18, 1967 J. C. SPERY 3,331,531

WRAPPER TYPE CARRIER

Filed Feb. 4, 1963 7 Sheets-Sheet 6

INVENTOR
JOSEPH C. SPERY
BY Irving Seidman
ATTORNEY.

WRAPPER TYPE CARRIER

Filed Feb. 4, 1963 7 Sheets-Sheet 7

INVENTOR.
JOSEPH C. SPERY
BY Irving Seidman
ATTORNEY.

United States Patent Office 3,331,531

Patented July 18, 1967

3,331,531

WRAPPER TYPE CARRIER

Joseph C. Spery, 527 Madison Ave., Rm. 1002, New York, N.Y. 10021

Filed Feb. 4, 1963, Ser. No. 255,744

22 Claims. (Cl. 220—115)

This invention relates in general to a foldable wrapper type carrier for cans or containers and the like, and more specifically to an improved wrapper type carrier constructed and arranged in a manner for attaining maximum strength with a minimum amount of material.

In modern day merchandising it is common practice to package and distribute canned products, e.g. beer, soda, and various other commodities, in wrapper type can carriers. Consequently there are many known constructions of such wrappers in use today. Because of the wide use made of such wrapper type carriers in present day merchandising the industry has been making a continuing effort to improve the constructions of such carriers, the ultimate end being to develop a wrapper type carrier having positive can retention characteristics while employing a minimum of material with maximum strength.

The more commonly used wrapper type constructions are sized to accommodate six can arranged in two rows of three cans each with the respective rows being disposed in side by side contiguous relationship. Heretofore, it was a common practice to wrap the cans so arranged in a can band blank having a width substantially equal to the length of the respective can rows, and a length equal to substantially twice the combined height and width of the respective can rows, i.e. the distance around the top, bottom and sides of the carton.

Such wrappers generally consisted of a carrier having opposed top and bottom panels with interconnecting side panels to define a closed figure having open end portions. With can bands of this type the end cans of the respective can rows were exposed, and the intermediate cans of the respective can rows were completely enclosed by the top, bottom and side panels of the can band. Because of the inherent structure of such can bands, loading of the same presented numerous problems. Also, the canned products, which required refrigeration, enwrapped in such can bands, e.g. beer, soda and the like, were not uniformly cooled. For this reason, cooling of the cans to a desired degree took a relatively long time. This resulted from the fact that the cans within the known band type carrier were not uniformly exposed to the circulating cooling currents of the refrigerating unit.

From a display standpoint, the known can bands had other objectionable characteristics. In order to avail the benefit of the advertising copy placed generally on the side panels of such wrappers, the unit pack had to be placed sidewise on the shelf. This it turned out resulted in a unit pack occupying much of a retail outlet's limited and valuable shelf space. As a result only a relative few carrier units could be placed sidewise on a given shelf space. If the open ends of the known can bands were placed to the front of the shelf in an effort to display a maximum number of units packed in a given shelf space, the valuable advertising copy placed on the side panels of the known can wrappers would be hidden and of no practical value.

It has also been further observed that the chimes of adjacent cans enwrapped in the known can wrappers tended to rise or rub against one another during the handling and transportation of such carriers. As a result excessive stresses and points of wear developed at the points of contact between the panels of the carrier and the cans contained therein. For this reason, the carrier or band wrapper tended to deteriorate or give at these points of excessive wear and stress, oftentimes causing such wrappers to fail. To overcome this potential failure, it has been heretofore necessary to increase the gauge, thickness or weight of the board used in order to reinforce the same. The increased gauge or thickness required to resist such failure served only to increase the amount and cost of the material employed in the fabrication of a given can wrapper.

Therefore, an object of this invention is to obviate the foregoing disadvantages by providing an improved wrapper type carrier which is constructed and arranged to enwrap a given number of cans with less material than is now known.

Another object is to provide an improved wrapper construction which is specifically arranged to attain maximum strength through the use of a minimum of material.

Still another object is to provide an improved wrapper type carrier in which each of the cans are positively secured therein.

Still another object is to provide an improved wrapper type carrier constructed and arranged so as to minimize excessive wear and stress imposed on the respective panels of the carrier due to rubbing or riding of the adjacent cans one on another.

Still another object is to provide a wrapper type can carrier in which each of the cans carried thereby are isolated one from the other so as to obviate chime riding, and the wear and stresses incidented therefrom through the employment of a minimum amount of material.

Still another object is to provide a can carrier constructed and arranged so that substantially all areas thereof subjected to excessive wear or stresses are reinforced.

Still another object is to provide a novel wrapper type can carrier formed from a single blank of strip material, and which is constructed and arranged to hold a row of cans so that each of the cans is equally exposed to enhance cooling the contents thereof in the event that such is desired.

Still another object is to provide a wrapper type can carrier constructed and arranged from a single blank of strip material, which in the folded position thereof, defines a closed quadrilateral figure having closed ends and open sides, and which is free of any intermediate partitioning panels extending between opposed panels thereof.

In accordance with this invention the foregoing objects, features and other advantages are attained by a novel wrapper type can carrier which can be readily formed from a single strip of blank material that can be readily folded about a series of transversely extending foldlines to define a closed quadrilateral figure having opposed top, bottom and connecting end panels. The arrangement is such that the closed figure which is formed has fully open sides and is free of any panels interconnecting the top and bottom panels between the end panels thereof. The top and bottom panels are each provided with a series of can retaining flaps or means, blanked therefrom, to positively retain each of the plurality of cans disposed in a row within the periphery of the carrier and between the ends thereof. The carrier is further provided with means for positively retaining the top and bottom panel contiguous the tops and bottoms of the cans retained therebetween.

In one form of the invention the panel retaining means comprise marginal flaps connected along the longitudinal edge portions of the top and bottom panels respectively, the marginal flaps being adapted to be reversely folded inwardly of the carrier along the respective foldlines which extend substantially coincident with the longitudinal edges of the respective top and bottom panels. Each of the marginal flaps are provided with means folded and/or blanked therefrom to engage the external chime portion of the respective can from a position normal thereto whereby the structure of the can per se serves to hold the respective top and bottom panels contiguous to the tops and bottoms of the cans disposed therebetween.

In another form of the invention the panel retaining means engaging the can chimes are blanked out of the respective top and bottom panels to define a tab which is folded inwardly of the can carrier and which is again reversely folded onto itself about an intermediate foldline so that the free edge thereof is adapted to engage the can chime from a position normal thereto.

In another form of the invention the panel retaining means are formed by creasing the top and/or bottom panels at can intervals to provide an inwardly extending reverse fold between adjacent cans contained within the carrier, and from which the retaining tabs are blanked and folded for engaging the can chimes so that the can structure serves as the means for maintaining the top and bottom panels close to the tops and bottoms of the respective can. In this manner retention of the can retaining flaps in the top and bottom panels within the chime or recessed ends of the respective cans is assured.

In another modification of the instant invention separating means are blanked from the respective top and bottom panels. The separating means comprise flaps which are foldable inwardly of the carrier so as to extend between the tangent point of adjacent cans and thereby prohibit the chime or end riding of adjacent cans on one another.

A feature of this invention resides in the provision wherein the wrapper carrier in the folded position thereof enwraps the row of cans so that the end panels of the wrapper are disposed contiguous to the end cans in the can row, and the top and bottom panels are disposed contiguous the tops and bottoms of the cans in the row.

Another feature resides in the provision of the wrapper type carrier construction which is free of any intermediate panels extending between top and bottom panels thereof.

Still another feature resides in panel retaining means constructed and arranged for engaging the exterior chime portions of the respective cans disposed within the carrier in a manner so that the structure of the cans per se serve as the means for positively maintaining the top and bottom panels contiguous to the tops and bottoms of the respective cans.

Another feature resides in novel separating flaps blanked from the top and bottom panels and folded inwardly of the carrier so as to extend normal with respect to its associated panel and between adjacent cans to prohibit overriding of the cans on one another and thereby minimize the stresses imposed on the wrapper as a result thereof.

Still another feature resides in the provision that the reversely folded marginal flap serves to reinforce the wear points of the carrier.

Still another feature resides in the provision that the reinforced wear points result in a substantial reduction in the gauge thickness, and weight of board otherwise required to form a satisfactory carrier of comparable size and shape.

Still another feature resides in an improved can retention flap.

Other features and advantges will become more readily apparent when considered in view of the drawings in which:

FIG. 4 is a fragmentary side view illustrating the upper portion of the carrier constructed from the folded blank of FIG. 2.

FIG. 5 is a view similar to that of FIG. 4, but illustrating the carrier constructed of the folded blank of FIG. 3.

FIG. 6 is a detailed plan view of a fragmentary portion of the blank of FIG. 2.

FIG. 6A is a perspective view of the detail of FIG. 6 shown in the folded operative position thereof.

FIG. 7 is a fragmentary detail of the blank of FIG. 3.

FIG. 8 is a perspective detail view illustrating the detail of FIG. 7 in folded position of the blank.

FIG. 9 is a fragmentary perspective view of a portion of a carrier formed in accordance with this invention from the blank of FIG. 2.

Figure 1:
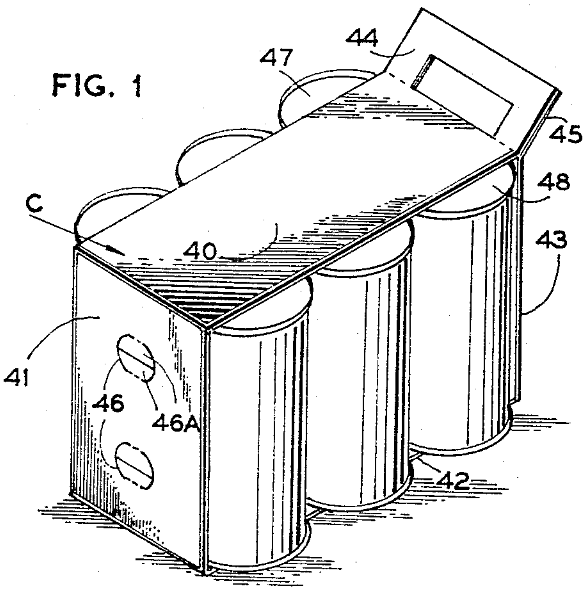
FIG. 1 is a diagrammatical perspective view showing in general the can carrier arrangement of this invention having full open sides, closed ends and free of any intermediate panels.

Referring to the drawings, there is shown in FIG. 1 a diagrammatic showing of the improved carrier C embodying the concepts of this invention. Essentially it comprises a single strip of blank material, e.g. paperboard, cardboard or the like which is folded about a plurality of spaced apart transverse foldlines to define a top panel 40, an end panel 41, a bottom panel 42 and a second end panel 43 connected in end to end relationship. The blank may contain additional material or extension piece 44, 45 adjacent the end of the top panel 40 and/or the second end panel 43 respectively, to define a handle flap to facilitate portage of the same. Finger carrying holes 46 may also be applied in the end panel 41 opposite the handle in the embodiment disclosed in FIG. 1. The finger holes 46 also serve to facilitate grasping the carrier C when the carriers of this invention are stacked on a shelf in a retail outlet. As shown the finger holes 46 are die cut to define flaps 46A which are hinged to the end panel 41 and are punched inwardly when a finger is inserted.

As shown in FIG. 1, the blank is folded so that the top and bottom panels 40, 42 extend in the direction of the can rows 47, 48 carried thereby, and the end panels 41, 43 are disposed contiguous the end cans of the can rows 47, 48. Consequently the blank when folded defines a quadrilateral closed figure having full open sides, and the construction thereof is such that it is entirely free of any intermediate panels interconnecting the top and bottom panels. Also it is to be noted that the width of the blank is less than that of the sum of the can diameters disposed side by side in the respective can rows 47, 48 within the carrier. For example, in the form shown in FIG. 1, the carrier C is constructed to accommodate six cans disposed in two rows 47, 48 of three cans each arranged in side by side relationship. However, it will be understood that the number of can rows and the number of cans in each of the rows can be varied without departing from the scope of this invention. In the form illustrated it will be noted that the six cans are carried in the wrapper in a manner wherein each is equally exposed. As a result, the carrier C being free of any intermediary panels, will permit cooling currents of air to circulate through the carrier and about the cans in a uniform manner when the cans contained by the wrapper of this invention are required to be refrigerated, e.g. beer and soda cans or the like. Thus, each of the cans can be uniformly cooled in a minimum of time, as compared to the cans enwrapped in known carrier constructions.

Figure 1A:
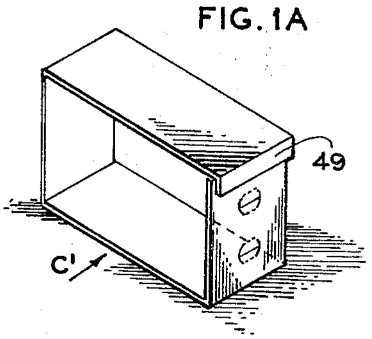
FIG. 1A is a diagrammatic perspective view of a modified carrier formed without the handle flap.

FIG. 1A illustrates a modified carrier C′ construction. This form is essentially similar to that described with respect to FIG. 1, except the handle flaps are omitted. In this form a securing end flap 49 is secured to one of the end panels to secure the blank in folded position.

For the foregoing general description of the carriers C and C′ it will be apparent that the length of board strip required to construct the wrapper is equal to at least twice the combined height and length of the respective can rows or twice the height and summation of the can diameters in the respective can rows; i.e.

$$L=2(h+l_R)$$

or $$L=2(h+x\cdot d)$$

where

L=the general length of the blank strip
$h$=can height
$l_R$=length of can row
$x$=number of cans in a given row
$d$=diameter of each can The above formula it will be understood will determine the length of strip material required to define the four panels 40, 41, 42, 43 defining the body of the carrier, the material for defining the handle flaps 44, 45 of carrier C, or end securing flap 49 of carrier C′, being an addition thereto. The width of the blank strip as seen in FIG. 1 is substantially less than the sum of two can diameters disposed in side by side relationship. As a result an efficient carrier is had with a minimum of board area.

Figures 2, 2A, 3, 3A:
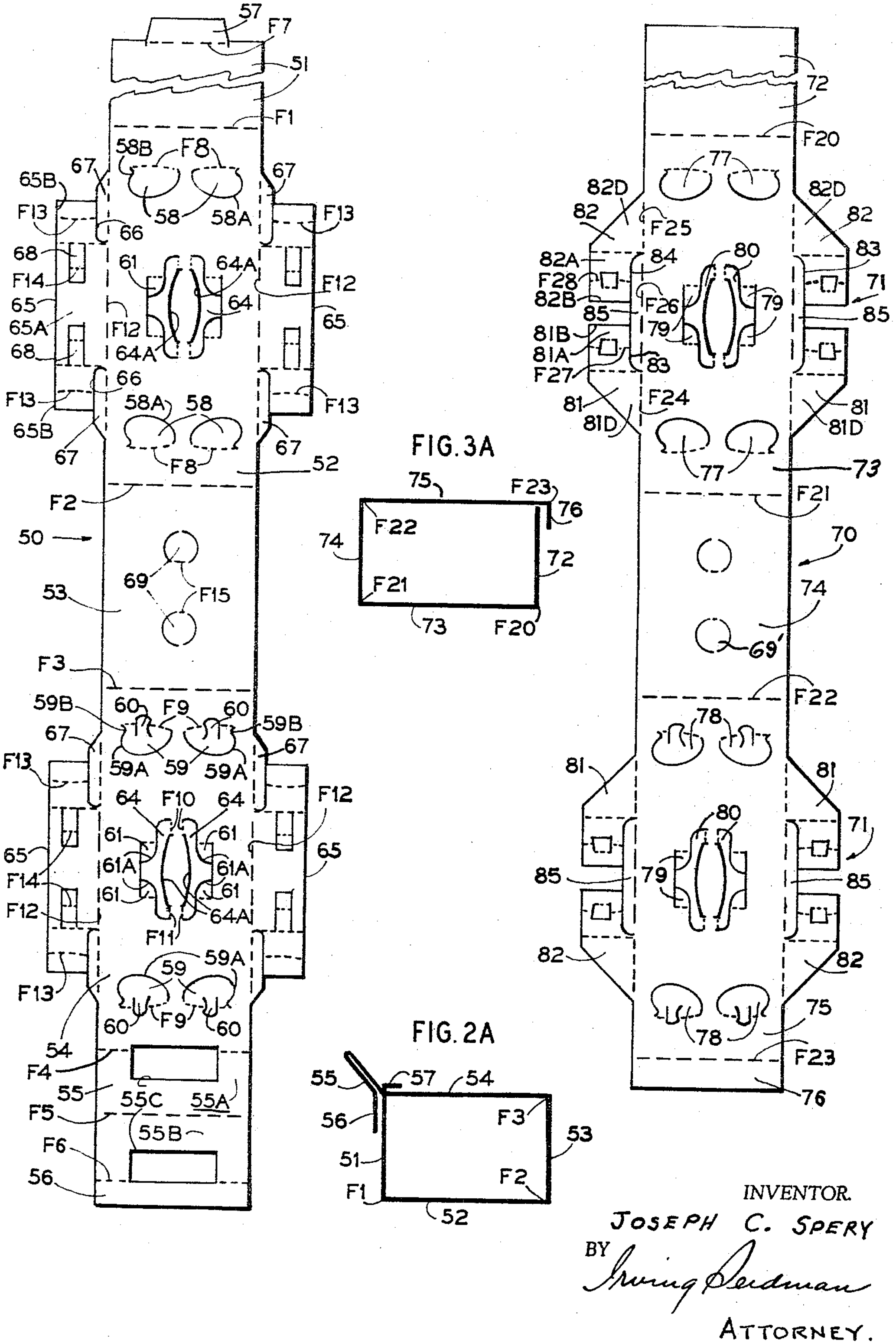
FIG. 2 is a plan view of a preformed blank from which the carrier of this invention is formed.
FIG. 2A illustrates the blank of FIG. 2 in folded position.
FIG. 3 is a plan view of a slightly modified blank from which a carrier of this invention is formed.
FIG. 3A illustrates the blank of FIG. 3 in folded position.

In accordance with this invention novel means are provided for retaining the cans in a positive manner within the carrier. Referring more specifically to FIGS. 2, 2A, 4, 6, 6A and 10 to 13, there is disclosed a specific blank construction 50 for embodying the invention. As shown in FIG. 2 the blank 50 comprises an elongated strip of cardboard, or paperboard, having a plurality of transversely extending foldlines $F_1$, $F_2$ and $F_3$ longitudinally spaced thereon. Accordingly, the blank 50 is divided into an end panel 51 connected along foldline $F_1$ to a bottom panel 52, and a second end panel 53 is connected between the bottom panel 52 and top panel 54 along foldlines $F_2$ and $F_3$, respectively. Connected to the other end of the top panel 54 along foldline $F_4$ is a handle flap 55 which is adapted to be folded onto itself along a foldline $F_5$. The reverse folds 55A, 55B of handle flap 55 have cut out portions to define a hand opening 55C whereby the handle may be readily grasped. An end securing flap 56 connected to the free end of the handle flap 55 along a foldline $F_6$ and another securing flap 57 is connected the end panel 51 along foldline $F_7$.

As shown, the bottom and top panels 52, 54 are each provided with a novel can retaining flap 58, 59 respectively, blanked out of their respective surfaces. In accordance with this invention the can retaining flaps 58, 59 for the end cans of the respective can rows are die-cut out of their respective panels along an arcuate die cut 58A, 59A. The die cut 58A, 59A is formed with a slight notch 58B, 59B adjacent the foldlines $F_8$, $F_9$ on the outer side thereof to define a substantially half heart shape flap, and the respective flaps 58, 59 adapted to be reversely folded inwardly of its respective panel about an arcuate foldline $F_8$, $F_9$ respectively. The purpose of the notches 58B, 59B is to facilitate positioning of the respective flaps during loading operation as will be hereinafter set forth.

In accordance with this invention the can retaining flaps 59 in the top panel is provided with a pull tab or end 60 which is blanked out of the top wall integral with that of the can retaining flap 59, the purpose and function of which is set forth in a copending U.S. application S.N. 145,678, filed Oct. 1, 1961, now Patent No. 3,140,036.

Figure 24:
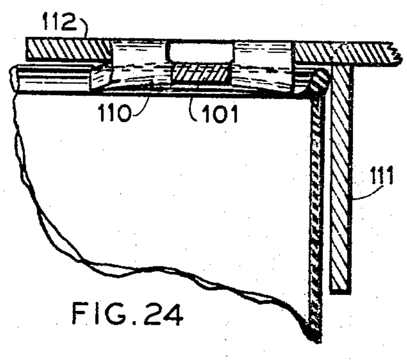
FIG. 24 is a section view taken along line 24—24 of FIG. 22 showing the can in its retained position within the carrier.
Figure 25:
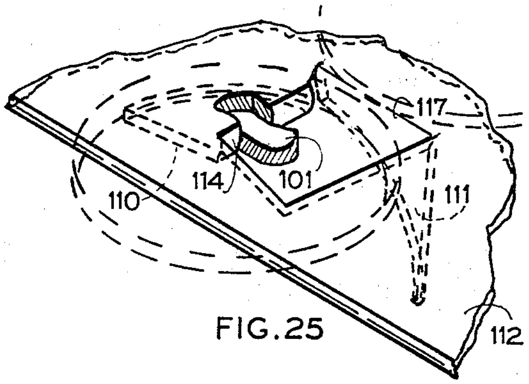
FIG. 25 is a perspective view of the fragmentary detail shown in FIGS. 22 and 24.

In accordance with this invention, the respective can retaining flaps 58, 59 are folded inwardly about an arcuate shaped foldline $F_8$, $F_9$ respectively. It has been discovered that by arching the foldline $F_8$, $F_9$ respective flaps have imparted thereto in the folds operative position a slightly curvelinear cross sectional shape which provides for greater strength and therefore a greater can retaining force. See FIG. 24. Thus the can retaining flaps so constructed exert a greater holding force on the can retained thereby.

To effect release of the can retained between opposed can retaining flaps 58, 59, a pull tab or end 60 is integrally connected to the retaining flap 58 of the top panel. Thus as described in copending application Ser. No. 145,-678, now Patent No. 3,140,036 supra, release is effected simply by lifting or pulling on the pull tab 60 to free the connected can retaining flap 59 from the can chime. Also, as will be hereinafter set forth the pull tab 60 also functions during a loading operation as a means to facilitate the folding of the connected can retaining flaps 59 inwardly of the carrier during the intial loading operation of the carrier.

Figure 10:
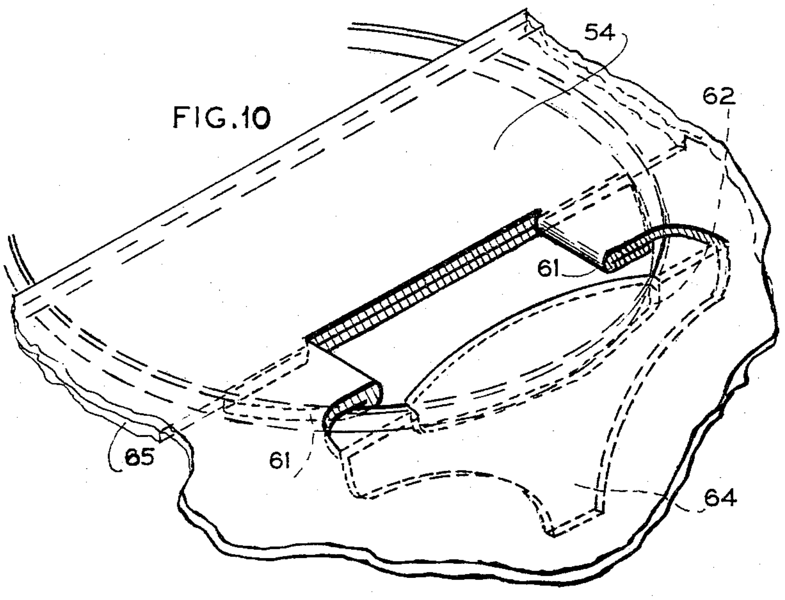
FIG. 10 is an enlarged detail shown in perspective of a flap retaining construction detail formed in the top and bottom panels of the blanks shown in FIGS. 2 and 3.
Figure 11:
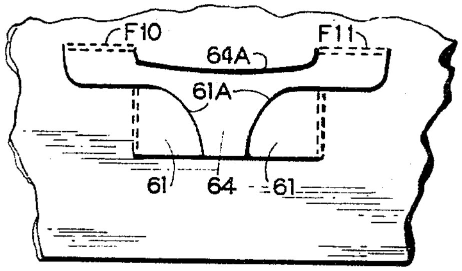
FIG. 11 is an enlarged plan view of the can retaining detailed construction shown in the top and bottom panels of the blanks of FIGS. 2 and 3.
Figure 12:
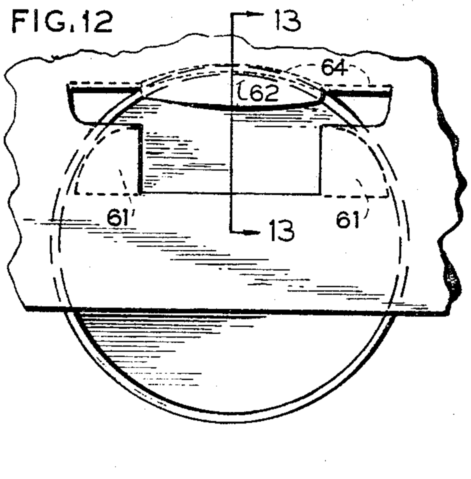
FIG. 12 is a plan view of the detail shown in FIG. 11, but illustrated in the folded position thereof and illustrating its relationship with respect to a can retained thereby.
Figure 13:
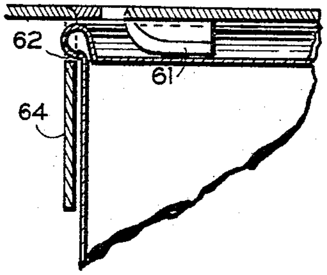
FIG. 13 is a sectional view taken along line 13—13 of FIG. 12.

In accordance with this invention the center cans of the respective can rows are retained in position between top and bottom panels 54, 52 by a pair of can retaining flaps 61 and a cooperating slot 62 for receiving the chime of the can formed therein, as best seen in FIGS. 9, 10 and 12. As shown, a pair of quadrant or quarter shaped flaps 61 are blanked out of the respective panels 52, 54 and are folded inwardly of the carrier to engage opposed chime portions of the center of intermediate can 63. Cooperatively associated with quadrant flap 61 is a chime holding flap 64 die cut so that when folded inwardly of the carrier it defines a slot 62 with its associated panel for receiving the can chime of the center can. As shown the quadrant can retaining flap 61 and one edge of the chime holding flap 64 are die cut along a common die cut line 61A, the other edge of flap 64 being die cut as at 64A so that when flap 64 is folded inwardly of the carrier about foldlines $F_{10}$, $F_{11}$, a chime slot 62 is defined between it and its associated panel.

In accordance with this invention the top and bottom panels 54, 52 have folded about foldline $F_{12}$ extending along their respective longitudinal edge portions opposed marginal flaps 65. Each of the marginal flaps 65 are similar but opposite in hand. Therefore for an understanding of the invention only one need be described. As shown, each marginal flap 65 is provided with a center portion 65A and opposed end portions 65B, the respective end portions 65B being die cut as at 66 to define an edging flap 67 which when folded together with the associated marginal flaps 65 inwardly about foldline $F_{12}$ serves to reinforce the edge portions of its respective panel against wear by the cans loaded therein.

In order to insure positive retention of the cans between opposed retaining flaps 58, 59 in the top and bottom panels 54, 52, means are provided to hold the top and bottom panel contiguous to the opposed can ends. As shown in the blank of FIG. 2, the opposed end portions 65B of the respective marginal flaps 65 are arranged to be reversely folded inwardly of the carrier foldline $F_{13}$ as better seen in FIGS. 4, 6A and 9, when the marginal flaps 65 are folded in overlying position to their respective panels. As best seen in FIG. 2, foldlines $F_{13}$ are slightly bowed to impart a curvature to the end flaps 65B so as to follow the curvature of the can wall. Viewing FIG. 9, it will be seen that the reversely folded end portions 65B of the marginal flaps 65 have an edge portion 65C disposed so as to engage the external chime portion of the end cans of the respective rows. Therefore the free edge of 65C of the marginal flap ends serves to wedge the can chime against the top or bottom panel. As seen, the edges 65C serve to retain the ends of the end cans against the respective top or bottom panel.

To maintain the centermost can against the respective top and bottom panels, a second panel retaining tab or flap 68 is blanked out of the central portion 65A of the marginal flaps 65. As shown in FIGS. 6 and 6A the second panel retaining flap 68 is reversely folded about foldline $F_{14}$, which may be slightly bowed, so that in the operative position, as shown in FIGS. 4, 6A and 9, panel retaining flaps 65B and 68 are disposed in back to back relationship. Thus in the folded portion of the blank 50 the respective panel retention flaps 65B, 68 are disposed between adjacent cans in a given row, and the back to back flaps each engage the external can chimes of adjacent cans. As a result when the retaining flaps 58, 59 of the bottom and top panels 52, 54 are rendered operative, it will be noted that the structure of the marginal flaps 65 of the opposed top and bottom panels serve to hold the top and bottom panel contiguous to the top and bottom of the cans disposed therebetween. Thus the structure of the cans per se function as the partition members between top and bottom panels. In this manner the can retaining flaps 58, 59 are positively held in position within the can chime, so as to insure against associated displacement of any of the cans from the carrier.

To effect easy removal of the cans from the carrier, one needs only to pull on the pull tab 60 of the can retaining flaps 59 to effect the release thereof from the respective can chime.

Referring to FIGS. 2A, 4, 6A and 9, it will be noted that the blank 50 of FIG. 1 is readily folded about foldlines $F_1$ to $F_7$ to define a closed quadrilateral figure having full open sides. To fold the blank, see FIG. 2A, the end panel 53 is folded about foldline $F_3$ normal to top panel 54, and the bottom panel 52 folded normal to end panel 53 about foldline $F_2$. End panel 51 is folded normal to bottom panel 52 about foldline $F_1$. The handle flap 55 is reversely folded so that securing end 56 overlaps the upper portion of end panel 51. The securing flap 57 connected along foldline $F_7$ is passed through the cutout openings 55C in the handle folds 55A, 55B so that it overlies a portion of the top panel 54. Suitable fastening means, e.g. glue, staples or the like secure ends 56, 57 to the end panel 51 and top panel 54 to maintain the strip or blank in its folded position. With the quadrilateral thus formed, it will be readily apparent that it can be folded flat for shipment to the ultimate user.

In accordance with this invention the can retaining flaps in the top and bottom panels are preformed in the blank and therefore require only that they be punched out and folded inwardly of the carrier prior to loading of the carrier. The marginal flaps in the operative position of the carrier are folded inwardly to override their respective top and bottom panels. It will be observed that in the folded position, marginal flap portion 65A and edging flaps 67 serve to reinforce the marginal edges of their respective panels against wear. Thus the wear edges are provided with a double thickness of board. For this reason, it is possible with the described construction to reduce the weight or gauge thickness of board heretofore customarily used with wrappers of the class to which this invention relates. The described construction results in the use of a minimum amount of material since both the area and weight of board required for an individual wrapper are substantially reduced over that of known constructions.

Figure 23:
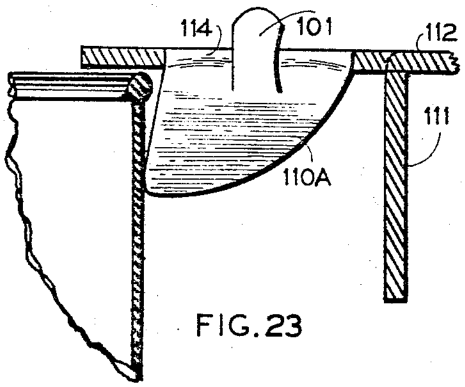
FIG. 23 is a detail sectional side view illustrating the can retaining flap of FIG. 21 folded out of the plane of the panel and illustrating a can being fed into the carrier.

In order to load the wrapper formed of a blank 50 as described, it is required that the folded blank 50 be first squared to a position as shown in FIG. 2A. The next operation requires that the respective can retaining flaps 58, 59, 61, 64 in the bottom and top panels be folded inwardly of their respective panels and that the marginal flaps 65 be folded in overlay position against their respective panels. The panel holding flaps 65C and 68 are then folded inwardly about their foldlines $F_{13}$, $F_{14}$ and maintained in their folded position. With the respective flaps so positioned the carrier is made ready to receive the cans. The cans are loaded three at a time through the opposed open sides of the carrier, each row of three cans being simultaneously loaded into the squared carrier. It will be observed that the respective retaining flaps 58, 59 are formed so that the cans retained thereby will contact the leading edge of its respective can retaining flap and force the can retaining flap into its reversely folded can holding position as the can is moved into the carrier. Initial contact of the can with the retaining flap is shown in FIG. 23. In accordance with this invention the notch 58B, 59B of the respective flaps 58, 59 prohibit jamming. It will be noted that as the cans are loaded into the carrier, the can engaging the leading edge of the flap will cause it to fold inwardly. The can chime thus slides into the notch 58B, 59B and over the flap, as the chime engaging the flap urges it into folded position. To assist in movement of the can retaining flaps 59 in the top panel into folded position a means on the loading machine may be designed to engage the pull tab of the can retaining flap. This is rendered feasible inasmuch as the pull tab 60 extends outwardly of the carrier in the initial folded position of flap 58. Thus the means on the loading means timed to the feeding of the cans into the carrier assists in rotating the flap 58 about its foldline $F_9$.

If desired finger gripper means may be provided in end panel 53. As shown, these means comprise a flap 69 blanked out along a die cut of substantial circular configuration and which flap is hingedly connected along a foldline $F_{15}$. Thus by inserting one's thumb and forefinger through the holes thus defined, the carrier can be readily grasped and pulled from a shelf or carrier thereby.

With the construction described it will be readily apparent that the carrier can be readily stacked on a shelf with its end panel directed toward the front of the shelf space. In this manner more carriers can be stacked on a given shelf since the width of the carrier is substantially less than the length thereof. For this reason valuable retail shelf space can be conserved. Also because the wrapper blank is folded about the ends of the respective can row, the respective end panels 51, 53 of the wrapper 50 can be utilized for advertising copy, visible to the consumer when stacked endwise on a shelf.

FIG. 3 illustrates a slightly modified form of the invention. In this form of the invention the blank 70 of FIG. 3 is substantially similar to blank 50 of FIG. 2, except that the handle flap 55 has been eliminated and marginal flap means 71 are slightly modified from that hereinbefore described. In this form it will be noted that blank 70 comprises an end panel 72, bottom panel 73, second end panel 74, a top panel 75, and a connected securing end flap 76 connected in end to end relationship, about respective foldlines $F_{20}$, $F_{21}$, $F_{22}$ and $F_{23}$. FIG. 3A demonstrates the blank 70 in its folded position.

Bottom panel 73 and top panel 75 are each provided with can retaining flaps 77, 78 respectively, similar to that described with respect to FIG. 2. Also panels 73, 75 are provided with similar can retaining flaps 79 and slot forming flap 80 combination for retaining the center or immediate can as specifically described with reference to FIGS. 2 and 9 to 13. Therefore, a further description of these details of construction is not necessary.

In this form of the invention the marginal flap means 71 along any one edge portion of the top or bottom panels 73, 75 comprises a pair of marginal flap portions 81, 82 which are foldable about respective foldlines $F_{24}$, $F_{25}$ so that in operative position they lie flush against their associated panel. Each of the flap portions 81, 82 is provided with facing end portions 81A, 82A which are die cut along lines 83, 84 respectively so as to define therebetween a reinforcing marginal edging 85 which can be readily folded inwardly of the carrier along $F_{26}$. As hereinbefore described the respective end portions 81A, 82A are adapted to be reversely folded about a respective intermediate foldline $F_{27}$, $F_{28}$, to define a creased fold 87 (FIG. 5), which in the operative position thereof is disposed between adjacent cans of a given row. The respective creased folds 87 are formed so that the free edge or ends 81B, 82B thereof engages the external portion of the can chime, and thus serves to wedge the end of the can between the edge or ends 81B, 82B of the respective fold 87 and its associate panel. See FIG. 5. In the illustrated embodiment the edges 81B, 82B of the crease fold 87 is disposed to operate on the middle can of the can row. In order to provide a panel folding flap for operating on the end can of the respective can rows disposed within the carrier formed by blank 70, as seen in FIG. 5, a flap 86 is blanked out of the one side 87A of the creased fold 87 so that in the folded position of the crease fold 87 flap 86 is folded about foldline $F_{28}$ out of the plane of fold 87 so that its free edge 86A is arranged to wedge the chime of the end can against the associate panel. A detail showing of the panel holding means defined by the marginal flaps 71 is shown in FIGS. 5 and 8.

Instead of handle flaps, finger gripping means 69' as hereinbefore described is provided in one or both of the end panels.

Except as herein described, the structure and operation of a carrier formed of blank 70 is similar to that described with respect to that of FIG. 2.

With this construction it will be apparent that the longitudinal edge portions of the respective top and bottom panels 73, 75 are reinforced by reversely folded edging flap 85 and the hinged portions 81D, 82D of the marginal flaps, and that of the creased fold 87 thereof, serve to prohibit bowing of the associated panel outwardly from the adjacent can ends.

Figure 15:
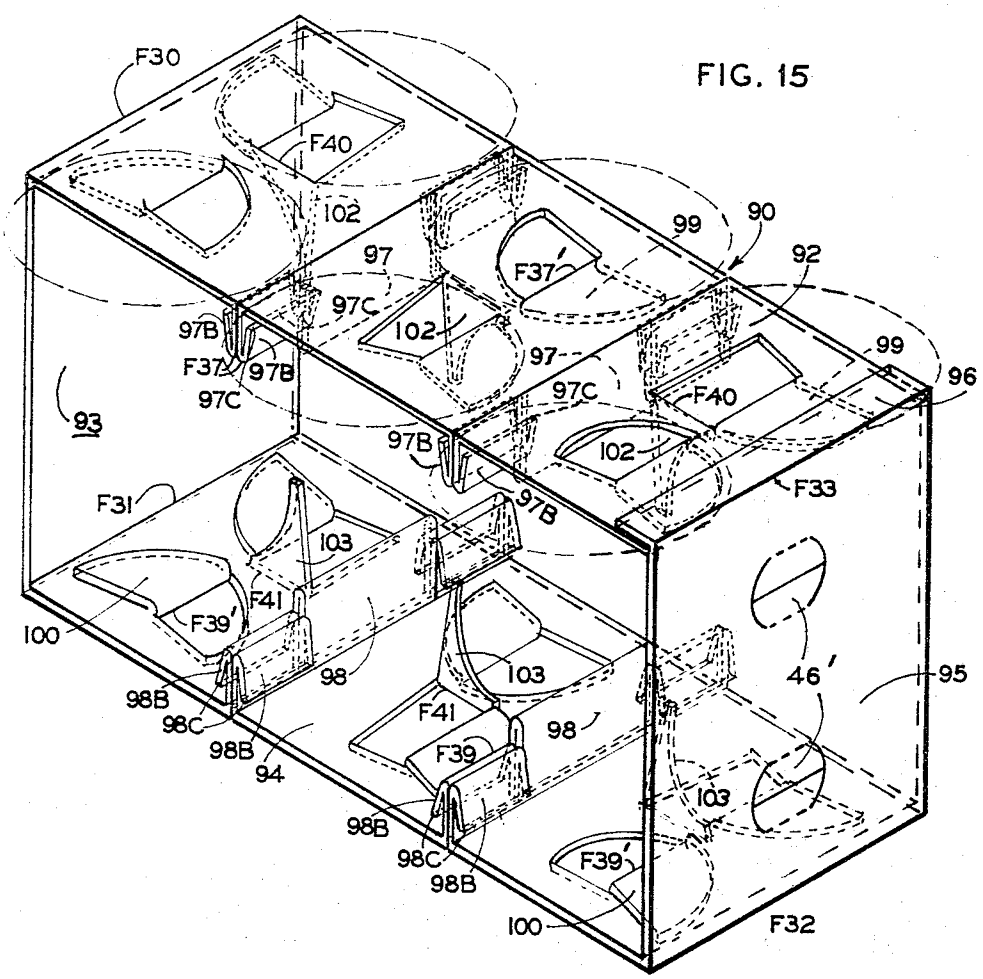
FIG. 15 illustrates a perspective view of the blank of FIG. 14 in its folded position.
Figures 14, 16, 16A:
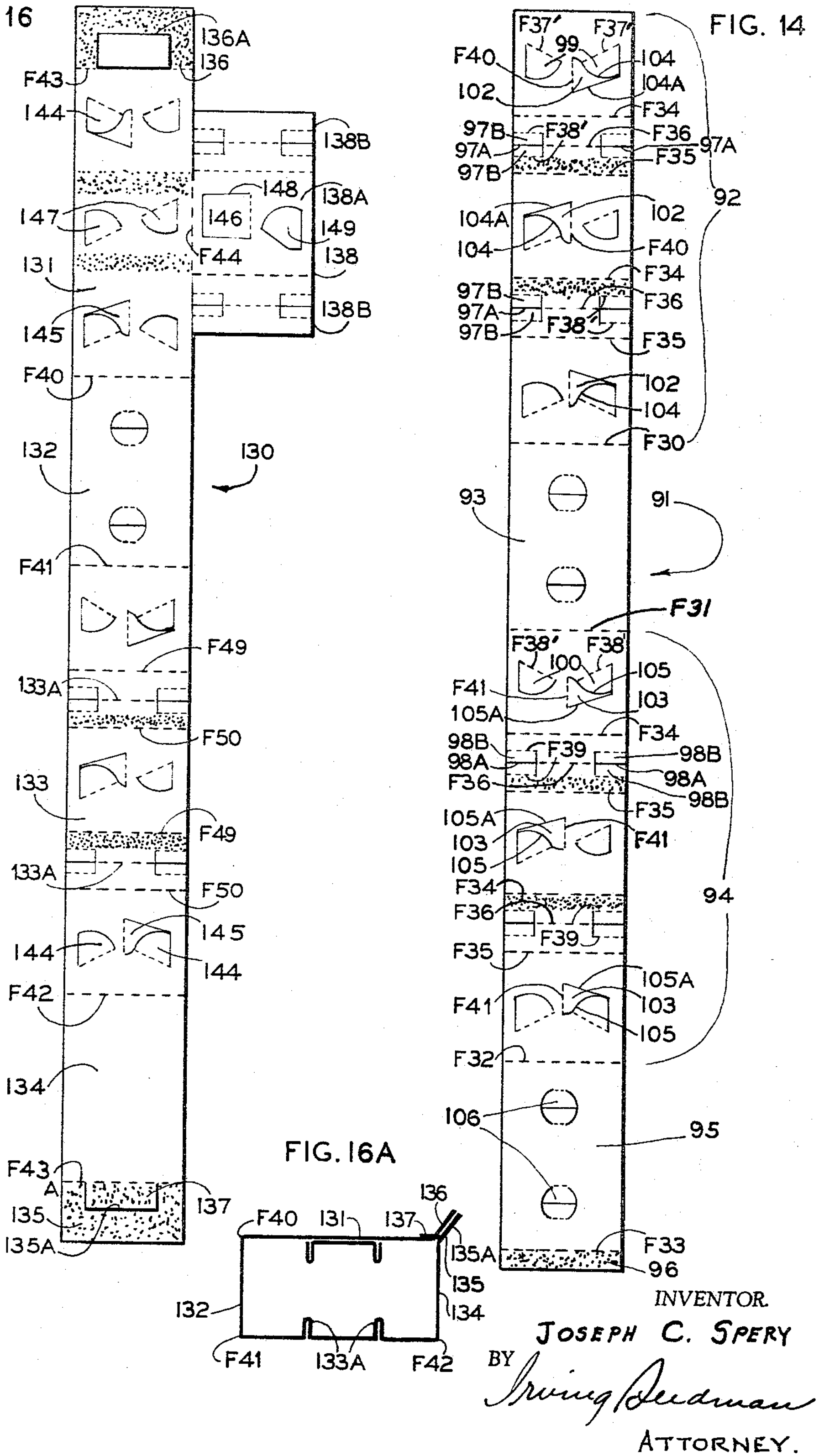
FIG. 14 is a plan view of another modified blank construction.
FIG. 16 illustrates a slightly modified form of blank construction from that shown in FIG. 14.
FIG. 16A shows the folded position of blank shown in FIG. 16.
Figures 17, 18, 19:
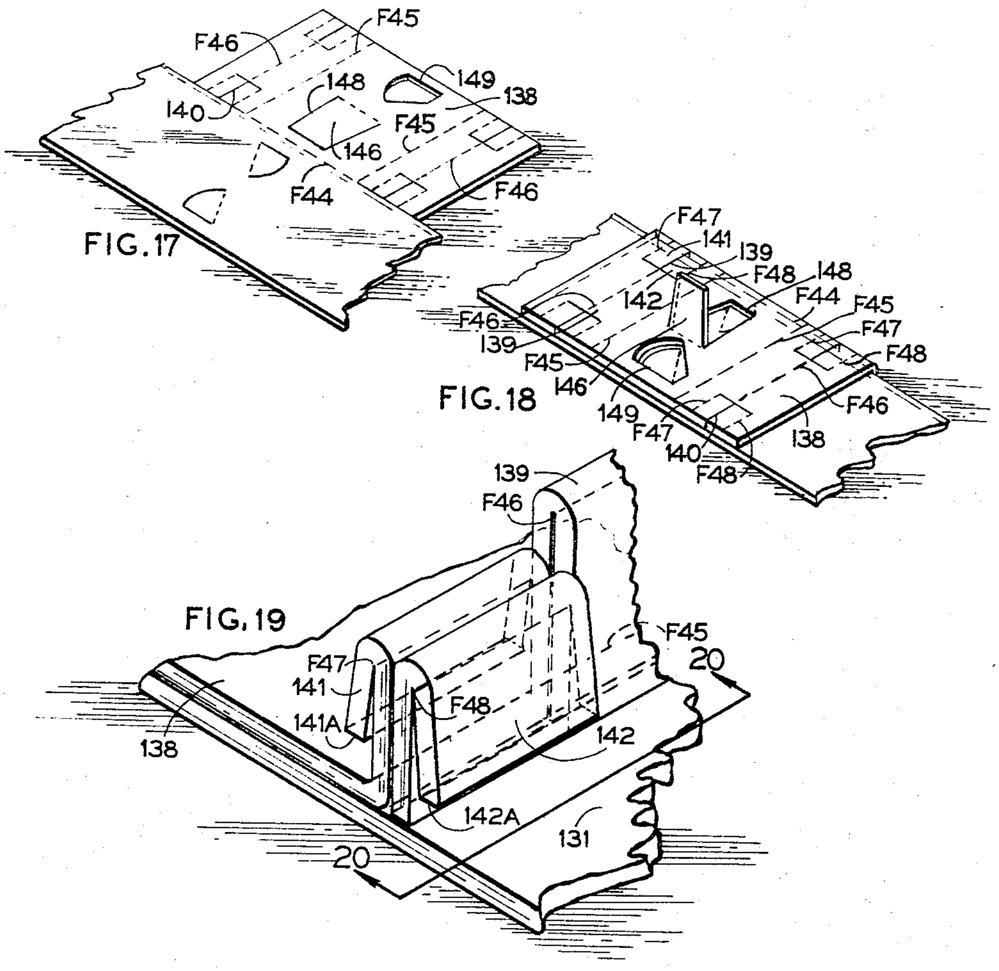
FIG. 17 is a fragmentary perspective view illustrating a detail of construction of the blank of FIG. 16.
FIG. 18 is a view similar to that of FIG. 17, but illustrating the portion of the blank in partially folded position.
FIG. 19 is a perspective fragmentary view illustrating the construction detail of FIGS. 17 and 18 in its folded operative position.
Figure 20:
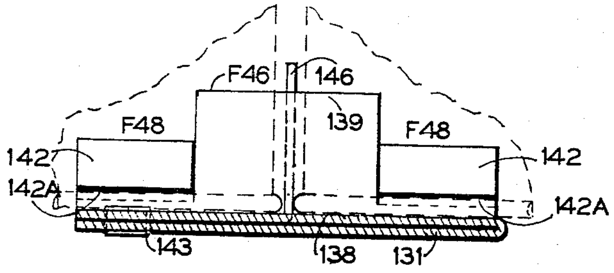
FIG. 20 is a full sectional view of the folded panel construction taken along line 20—20 of FIG. 19.
Figure 21:
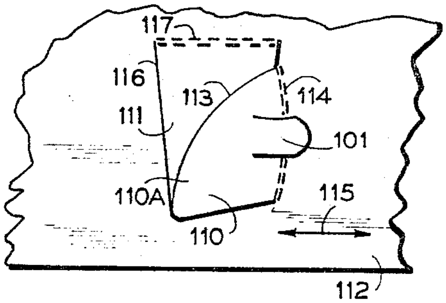
FIG. 21 is a slightly modified can retaining flap for use in a blank construction of FIG. 14.
Figure 22:
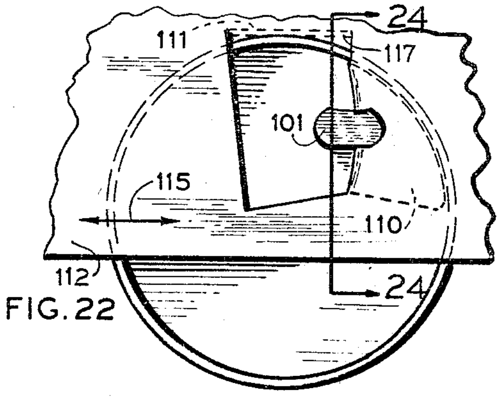
FIG. 22 illustrates the construction detail of FIG. 21 in folded can retaining position.

FIGS. 14 and 15 illustrate a further embodiment of the invention. In this form of the invention the carrier 90 illustrated in FIG. 15 is formed from an elongated strip of blank 91 material shown in FIG. 14. Referring to FIG. 14 the strip 91 comprises an elongated piece of material of cardboard or the like having a top panel 92, an end panel 93, a bottom panel 94 and a second end panel 95 connected in end to end relationship with an end securing flap 96 connected to one end of the strip. In this form of the invention the opposed end panels 93, 95 are similarly formed as are the top and bottom panels 92, 94. The respective panels 92 to 95 are folded about respective foldlines $F_{30}$, $F_{31}$, $F_{32}$, $F_{33}$ to define a closed quadrilateral figure as shown in FIG. 15, free of intermediate panels interconnected between the top and bottom portions. The end flap 96 is secured to the other free end of the wrapper strip by any suitable means for maintaining the wrapper in folded position. In this embodiment the top and bottom panels 92, 94 are each formed in the folded position thereof with a pair of opposed inwardly extending folds 97, 98 integrally creased therein and extending transversely thereof. The opposed creased folds 97, 98, as best seen in FIG. 15, thus define open sided cells for receiving the respective cans. In the illustrated embodiment, two cans are disposed in side by side relationship in each cell so formed. See FIG. 15 where can tops are shown in phantom.

In accordance with this invention the creased folds 97, 98 of the respective panels 92, 94 are formed by folding the respective panels 92, 94 about foldlines $F_{34}$ and $F_{35}$ to define folds 97, 98 reversely creased about a central foldline $F_{36}$. In the illustrated embodiment the top and bottom panels 92, 94 are provided with two such folds 97, 98 respectively to define the three cells. Thus it will be apparent that the number of folds 97, 98 required in the respective panels 92, 94 is one less than the number of cans disposed in the can row adapted to be carried by the carrier. Therefore, the length of board required in the top and bottom panel must include the material from which the respective creased folds 97, 98 are formed. In the illustrated embodiment it will be noted that the respective opposed creased folds 97, 98 extend into the carrier only a slight distance. In the assembled position the folds are maintained by suitable adhesive.

In order to provide panel retaining means so as to prohibit outward bowing of the respective top and bottom panels 92, 94 the end portions of the respective crease folds 97, 98 are severed with a T-shaped die cut 97A, 98A, as best seen in FIG. 14, and the severed ends 97B, 98B of the folds being oppositely and reversely folded about foldlines $F_{38}$, $F_{39}$ so that the free edge portions 97C, 98C of the respective severed ends 97B, 98B engage the can chime of adjacent cans in a given row, and thereby wedge the same between the free ends 97C, 98C of the severed flaps 97B, 98B and its associated panel. In this manner each of the adjacent cans of the respective can rows have their end portions held fast in contiguous relationship with the top and bottom panels 92, 94. Also the transversely extending crease folds 97, 98 serve to prohibit the chime portion of the cans in any given row from riding on one another.

In accordance with this invention can retaining flap means in combination with novel separating means are blanked out of the respective top and bottom panels 92, 94. As shown, opposed can retaining flaps 99, 100 are blanked out of the top and bottom panels 92, 94 respectively for each can retained therebetween. The respective can retaining tab flaps 99, 100 are die cut with an arcuate chime engaging edge portion which when reversely folded about their respective foldlines $F_{37'}$, $F_{38'}$ inwardly of the carrier will engage the chime of the can as is well known. In the illustrated embodiment of FIGS. 14, 15 the can retaining flaps 99, 100 are illustrated without the pull tab; however, if desired the pull tab 101 may be formed integral therewith as shown in FIGS. 21 to 27. Thus in viewing FIGS. 14 and 15, each cell portion of the carrier is provided with a pair of opposed can retaining flaps 99, 100.

In accordance with this invention one of each of the opposed pair of can retaining flaps 99, 100 has associated therewith a can separating means 102, 103. As shown, the can separating means 102, 103, respectively, comprise a flap which is blanked out of the respective top and bottom panels and which is adapted to be foldable about respective foldines $F_{40}$, $F_{41}$ inwardly of the carrier, so as to be disposed normal to its associated panel. It will be noted that the respective foldlines $F_{40}$, $F_{41}$ of separating flaps 102, 103 are coincident to the longitudinal centerline of the carrier. Thus the separating flaps 102, 103 in the folded position thereof are disposed between the point of tangency of the pair of cans disposed in each of the carrier cell portions. Therefore, it is evident that the separating flaps 102, 103, prohibit the can pairs in each of the cells from riding on one another. Consequently the transversely extending opposed creased folds 97, 98 and the respective separating flaps 102, 103 cooperate to isolate one can from the other so that chime riding is completely eliminated. Thus the stress resulting therefrom is eliminated from this carrier.

As shown in FIGS. 14 and 15 the separating flaps 102, 103 are arranged so that they will have edge portions defined by die cut lines common to one of the retaining flaps 99, 100. Thus the can retaining flaps 99, 100 and cooperating separating means 102, 103 can be formed by a die cut 104, 104A, and 105, 105A, respectively, and the respective retaining flap and separating flap folded out of the plane of its respective panel about its own foldline $F_{37}$, $F_{38}$.

In the form of FIGS. 14, 15, the means for carrying the carrier include a pair of finger holes 46′ blanked out of the end panels 93, 95. The finger holes 46′ may be formed in one or both of the respective end panels.

FIGS. 21 to 25 illustrate a slightly modified construction of the combined can retaining flap 110 and can separating flap 111 which can be utilized in the embodiment herein described. As shown in FIGS. 21 to 25 the can retaining flap 110 is blanked out of a top or bottom panel 112 along a die cut 113, and the retaining flap so formed is provided with a can retaining portion 110A and a pull tab portion 101. The can retaining portion 110A and integral pull tab 101 is adapted to be reversely folded about an arcuate foldline 114, which as illustrated is disposed substantially normal to the graining of the panel, the direction of the graining being indicated by arrow 115. Accordingly the separating flap 111 is blanked out of the panel 112 by a die cut 116 intersecting with die cut 113 and foldable about hinge line 117. Thus it will be apparent that can retaining flap 110 and separating flap 111 have substantial portions thereof defined by a common die cut 113. For the foregoing defined interrelationship between the separating flap 111 and retaining flap 110, it will be observed that sufficient can retention strength and can separation is attained with a minimum of material, and which material can be completely blanked out of the panels 12 of the carrier. The arcuate foldline 114 about which the can retaining flap 110 folds serves to increase the holding force of the flap 110 for reasons hereinbefore described with reference to FIG. 2.

Figure 26:
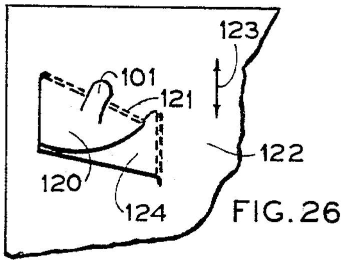
FIGS. 26 and 27 are slightly modified can retaining tabs or flaps constructed in accordance with this invention.

The embodiment of FIG. 26 is similar to that of FIGS. 21 to 25 with the exception that the can retaining flap 120 is foldable about a straight foldline 121 disposed at an angle with respect to the grain run of the associated panel 122, the graining being indicated by arrow 123.

Figure 27:
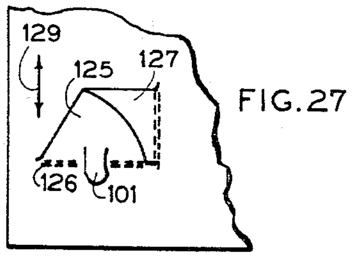

The showing of FIG. 27 is similar to that of FIG. 26 except that the retaining flap 125 folds about foldline 126, which is straight and disposed normal to the graining of the panel, the latter running in the direction indicated by arrow 129.

Each of flaps 120, 125 of FIGS. 26, 27 is shown with a pull tab 101, and a separating flap 124, 127 cooperatively associated with the respective flaps 120, 125. The construction and operation of the separating flaps 124, 127 respectively are similar to that hereinbefore described.

FIGS. 16 to 20 are directed to still another embodiment of the invention. In this form of the invention the blank 130 comprises a strip defining a top panel 131, an end panel 132 connected thereto along a foldline $F_{40}$, a bottom panel 133 connected to the end panel 132 along foldline $F_{41}$, and a second end panel 134 connected to the bottom panel 133 along foldline $F_{42}$. Connected to each end of the strip 130 is a handle flap 135, 136 folded to the free end portion of the top and end panels 131, 134 respectively along foldlines $F_{43}$ and $F_{44}$. Each of the handle flaps 135, 136 is provided with a cutout 135A, 136A to define a hand grip, the flap 137 defined by cutout 135A being adapted to extend through cutout 136A to form a securing end for maintaining the blank 130 in folded position.

As shown, a top sub-panel 138 is connected to a longitudinal edge portion of the top panel 131, and the sub-panel 138 is adapted to be folded in underlying relationship with respect to the top panel 131 along a foldline $F_{44}$. The top sub-panel 138 comprises a central portion 138A which is hinged to the top panel 131 along foldline $F_{44}$, and a pair of opposed end portions 138B which are adapted to be reversely folded inwardly of the carrier in the folded position of the blank to define opposed, inwardly extending folds 139 extending transversely of the carrier.

Referring to FIGS. 17 to 20, the end portions 138A of the sub-panel 138 is defined by a pair of foldlines $F_{45}$, $F_{46}$ about which the respective crease folds 139 are formed along each end of the central portion of the sub-panel. The opposed end portions 138A are first folded inwardly of the carrier along respective foldlines $F_{45}$ and then reversely folded along foldlines $F_{46}$. The opposed end portions of the crease fold 139 so formed is severed by a T-shaped die cut 139 so that the severed ends 141, 142 may be oppositely and reversely folded, (see FIG. 20), about foldlines $F_{47}$ and $F_{48}$ so that the respective free edges 141A, 142A of the severed ends 141, 142 are adapted to engage the chime of cans disposed on either side of the crease fold 139, and thereby define a panel retaining flap.

The bottom panel of blank 137 is constructed in a manner similar to the bottom panel 94 described with reference to FIGS. 14 and 15. Thus the crease folds 133A formed integral with the bottom panel, as herein defined, by the portion of the panel disposed between foldlines $F_{49}$, $F_{50}$ defined with the folds 139 of the top sub-panel 138 define the respective can cell areas of the carrier as described with reference to FIG. 15.

In the folded position of the blank as shown in FIG. 16A, the end panel 132 is folded normal to the top panel 131 along foldline $F_{40}$ and the bottom panel 133 is folded normal to end panel 132 along foldline $F_{41}$. The other end panel 134 is folded normal to the bottom panel 133 along foldline $F_{42}$. The two handle flaps 135, 136 are disposed into contiguous overlying relationship with respect to one another. To secure the blank in folded position the inner surface of the respective handle flaps 135, 136 may be coated with a suitable bonding cement, or otherwise secured by suitable fastening means. Also the flap 137 defined by the cutout of one handle 135 is folded through the cutout 136A of the other handle 136 to overlie and fasten to the top panel.

The reverse folds 133A formed integral in the bottom panel 133 may also be adhesively secured in order to maintain the cell separation defined thereby.

The sub-panel 138 is folded about its foldline $F_{44}$ and it is secured by a staple 143 or other suitable means to the under surface of the top panel 131, the opposed ends 138A thereof being folded about their respective foldlines $F_{45}$, $F_{46}$ to define the folds 139 adjacent the upper panel 131.

It will be observed that the blank 130 of FIG. 16 has also formed in the top and bottom panels can retaining flaps 144 and can separating flaps 145 similar, for the most part, as those described with respect to FIGS. 14 and 15. However, the blank of FIG. 16 differs slightly from that of FIG. 14 in that the separating flap for separating the upper can chimes of the middle pair of cans is defined by a flap 146 blanked out of the sub-panel 138, and that the can retaining flaps 147 for engaging the upper chime of the middle pair of cans are blanked out of the top panel 131 as shown. Thus it will be apparent that the portion of the sub-panel 138 from which the separating flap 146 has been blanked defines an opening 148 through which one can retaining flap 147 extends when reversely folded to engage one of the middle cans. To accommodate the other can retaining flap 147, a portion of the sub-panel lying immediately below the same is blanked out to define an opening 149. Thus, in the folded position of the sub-panel 138 the central pair of can retaining flaps 147 of the top panel 131 are free to fold through openings 148, 149 to engage with the chime of their respective cans, and the opposed end portions 141, 142 of the respective upper folds 139 and those of the lower folds 133A serve to hold the top and bottom panels 131, 133 contiguous to the opposed ends of the cans positioned therebetween.

Therefore, from the descriptions of each of the foregoing modifications it will be apparent each of the carrier forms have opposed top and bottom panels interconnected by opposed end portions to define a quadrilateral having full open side portions through which the cans can simultaneously be loaded, and means for utilizing the structure of the cans per se to maintain the opposed top and bottom panels contiguous to the opposed ends of the cans disposed therebetween. Also, novel can retaining flaps have been described which enhance the can retention characteristics thereof. Also a can retaining flap construction is described which greatly minimizes jamming during a can loading operation. In conjunction with the can retaining means and panel holding means herein described, the instant invention further contemplates means in the nature of separating flaps for minimizing stresses and wear imposed on the panels of the carrier due to overriding of adjacent can chimes on one another.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A wrapper type carrier adapted to enwrap a plurality of chime end cans disposed in a row, said carrier comprising opposed top and bottom panels disposed contiguous to the tops and bottoms respectively of the cans, and opposed end panels interconnecting said top and bottom panels to define a closed quadrilateral figure free of any intermediate panel extending between the top and bottom panels and having open sides, said end panels being disposed contiguous to the end cans of said row, can retaining flaps blanked out of said top and bottom panels which are adapted to be folded out of the plane of their respective panels and inwardly of said carrier to engage the chime of said cans for retaining the cans in place within said figure, and panel retaining means connected to said top and bottom panels for positively retaining said top and bottom panels parallel and contiguous to said tops and bottoms of said containers so as to assure retaining of said flaps in engagement with said chimes said panel-retaining means including a reversely folded tab disposed contiguous to said top and bottom panel and said reversely folded tab having its free edge adapted to engage the chime of adjacent can, said reversely folded tab extending transversely of the respective top and bottom panels and substantially parallel to said end panels.

2. The invention as defined in claim 1 wherein said panel retaining means comprises a marginal flap connected along the opposed longitudinal edges of said top and bottom panels, said marginal flaps being adapted to be folded inwardly of said carrier along a foldline substantially coincident the longitudinal edge of said top and bottom panels whereby said marginal flap lies flush against its respective panel, and said marginal flaps having an end portion thereto reversely folded inwardly of said carrier to define a retaining tab disposed normal to the plane of said marginal flap, said tab having a free edge adapted to engage the can chime whereby the chime of the can is held between the edge of said tab and the associated panel.

3. The invention as defined in claim 2 wherein said marginal flap includes a second reversely folded tab blanked out of said flap, said second tab being folded about a foldline substantially coincident with the foldline of said first mentioned tab, and said second tab having a reversely folded free edge adapted to engage the chime of a next adjacent container.

4. The invention as defined in claim 1 wherein said panel retaining means comprises a tab blanked out of said top and bottom panels, said tab being reversely folded inwardly of said carrier about an intermediate transverse foldline, said tab having a free edge adapted to engage the chime portion of one can, and a second tab blanked out of said first mentioned tab, said second tab having a free edge portion adapted to engage the chime portion of one can, and a second tab blanked out of said first mentioned tab, said second tab having a free edge portion adapted to engage the chime of a next adjacent can.

5. The invention as defined in claim 4 wherein said intermediate transverse foldline is arcuate so that said tabs conform substantially to a circumferential portion of the can adjacent thereto.

6. A blank construction for forming an improved multiple can carrier comprising a blank of strip material including a top panel, an end panel, a bottom panel, and a second end panel connected in end to end relationship and adapted to be folded about transversely extending foldlines to define a closed quadrilateral figure free of any intermediate panels connected between said top and bottom panels and having open sides whereby said closed figure is adapted to enwrap at least three chimed end cans disposed in a row, said end panels being disposed contiguous the end cans in said row and the side portions of each can in said can row extending partly beyond the longitudinal edge portions of the respective top and bottom panels to partially extend through the open side of the carrier, and said top and bottom panels being disposed contiguous to the tops and bottoms of said can in said row, and can retaining means blanked out of said top and bottom panels and foldable inwardly thereof for retaining each of the cans of said row within said closed figure, and means contiguous to said top and bottom panels for positively retaining said top and bottom panels adjacent to the top and bottoms of said cans so as to insure positive engagement of the can retaining means with the chime of said cans, and said panel-retaining means extending transversely of said top and bottom panels.

7. The invention as defined in claim 6 wherein said last mentioned means includes a panel retaining tab blanked from said top and bottom panel and adapted to be folded inwardly of said container between upright walls of adjacent cans, and said tab having an edge portion adapted to engage the chime extending laterally of the upright wall of an adjacent can whereby said chime portion is wedged between the free edge of said tab and the panel integral with said tab so that said tab restrains outward bowing of said top and bottom panel and thereby assures positive retention of the can retaining flaps in the chimed ends of said cans.

8. The invention as defined in claim 6 wherein said last mentioned means comprises a marginal flap connected along the opposed longitudinal edges of both said top and bottom panels, said marginal flaps being adapted to be folded inwarrdly of said figure along a foldline substantially coincident with the longitudinal edges of said top and bottom panels whereby said marginal flaps are flush against their respective panels, and said flaps each having end portions reversely folded inwardly of said carrier to define retaining tab disposed normal of said flap, said tab having a free edge adapted to engage the external chime portion of a can.

9. The invention as defined in claim 8 wherein each of said marginal flaps includes a second reversely folded tab formed from said flap, said second tab being reversely folded about a foldline coincident with the foldline of said first mentioned tab, and said second tab having its free edge adapted to engage the chime of a next adjacent can.

10. The invention as defined in claim 6 wherein said last mentioned means comprises a tab blanked out of said top and bottom panels, said tabs being reversely folded inwardly of said carrier about an intermediate arcuate foldline, and said tab having a free edge adapted to engage the external chime portion of a can, and a second tab blanked out of said first mentioned tab, said second tab having a free edge portion adapted to engage the external chime of a next adjacent container.

11. A wrapper type carrier adapted to enwrap a plurality of individual cans arranged in multiple rows disposed in side by side relationship, and each of said rows including an equal number of three or more cans, said carrier comprising a top, bottom and opposed connecting end panels arranged to define a closed quadrilateral figure free of any intermediate panel connected between the top and bottom panels and having open sides in which the end panels are disposed contiguous to the endmost cans of said rows, the width of said carrier being less than the summation of the container widths of said rows disposed alongside one another so that a side portion of each can in said can rows extends beyond a longitudinal edge portion of said top and bottom panel whereby said portion of each can in said row extends partially through said open side, and means integrally connected to said top and bottom panels for retaining the cans within said carrier, and means blanked out of said top and bottom panels folded inwardly of said carrier to extend between the chimes of adjacent cans to prohibit the chimes of adjacent cans from riding on one another.

12. A wrapper type carrier adapted to enwrap three or more chimed end cans comprising (a) a strip of blank material foldable about transversely extending foldlines to define
(b) a top panel,
(c) a bottom panel,
(d) and opposed interconnecting end panels,
(e) said panels in the folded position of said blank defining a closed quadrilateral figure having open sides and free of any intermediate partitioning panels interconnecting said top and bottom panels, and said carrier being adapted to enwrap at least one row of cans whereby said top and bottom panels are disposed contiguous the tops and bottoms respectively of said cans, and said end panels being disposed contiguous the end cans of said row,
(f) can retaining flaps blanked out of said top and bottom panels respectively,
(g) each of said can retaining flaps including a chime engaging portion adapted to engage the inner periphery of the can chime, and a pull tab portion to facilitate release of said cans,
(h) said chime engaging portion being folded about a foldline inwardly of said carrier,
(i) and said chime engaging portion having a leading edge adapted to engage a can whereby said can functions to cam said flap into can retaining position,
(j) and panel retaining means for maintaining said top and bottom panels from bowing outwardly with repect to the tops and bottoms of the cans enwrapped in said carrier,
(k) said panel retaining means comprising
(l) a marginal flap connected to the opposed longitudinal edges of said top and bottom panels intermediate the ends thereof,
(m) said marginal flaps being folded inwardly of said carrier about a foldline so as to lie flush against the inside marginal edges of the respective top and bottom panel,
(n) the opposed ends of the respective marginal flap being reversely folded inwardly of said carrier about an foldline to define a panel retaining tab having a free edge,
(o) said free edge being disposed normal to said can chime and adapted to engage the external periphery thereof for wedging said chime between said free edge of said panel retaining tab and associated wrapper panel.

13. The invention as defined in claim 12 including means blanked out of said top and bottom panels for positively maintaining said marginal flaps in folded position against its respective top and bottom panel.

14. The invention as defined in claim 13 wherein said latter means define with the top and bottom panel from which is blanked a slot for receiving a can chime.

15. The invention as defined in claim 12 including (a) second panel retaining tab foldable about a foldline common to said first mentioned tab,
(b) and said second tab being reversely foldable in back to back relationship to said first mentioned panel retaining tab,
(c) and said second tab having a free edge adapted to engage an adjacent can chime.

16. The invention as defined in claim 12 including:

(a) a second tab blanked out of said reverse fold of said marginal tab, said second tab having a free edge adapted to engage the external chime of a next adjacent can.

17. A wrapper type can carrier comprising a strip of blank material folded along transversely extending foldlines to define top, bottom and opposed interconnecting end panels, said panels defining a closed figure having open sides and adapted to embrace a row of cans therein, means for retaining each of said cans within said figure, said means including can retaining flaps blanked out of said top and bottom walls so as to be foldable about respective foldlines inwardly of said carrier, said flaps having a can chime engaging portion adapted to engage the inner periphery of the can chime, and can separating means blanked from said top and bottom panels, said separating means including a flap foldable at its connected foldline inwardly of said carrier so as to be disposed substantially normal to its connected panels, and said separating flap being disposed so as to extend between the tangent point of two adjacent cans of said row.

18. The invention as defined in claim 17 wherein the foldlines of the respective can retaining flaps and separating flaps are angularly disposed with respect to one another.

19. The invention as defined in claim 18 wherein the foldlines of the separating flaps are substantially coincident with the longitudinally extending centerline of said top and bottom panels respectively.

20. A wrapper type carrier adapted to enwrap a plurality of cans disposed in a row comprising:

(a) a strip of blank material folded along transversely extending foldlines to define
(b) a top panel,
(c) bottom panel, and
(d) opposed side panels interconnecting the ends of said top and bottom panels,
(e) can retaining means blanked out of said top and bottom panels,
(f) a sub-panel hingedly connected along an intermediate longitudinal edge portion of said top panel,
(g) said sub-panel being adapted to be folded inwardly of said carrier so as to lie flush against the undersurface of said top panel,
(h) said sub-panel having cut out portions for accommodating a can retaining means blanked out of said top panel, and said sub-panel having its opposed transversely extending marginal portions reversely folded to define a creased fold extending inwardly of said carrier, (i) means blanked out of said creased fold to define panel holding tabs adapted to engage the chime of the cans contained within said carrier, (j) and said bottom panel having formed integral therein reverse folds disposed in alignment with the creased folds of said sub-panel, (k) and means blanked out of said bottom reverse folds to define panel holding tabs adapted to engage the chime of said cans.

21. The invention as defined in claim 20 and including separating means blanked out of said top and bottom panels, said separating means being folded inwardly of said carrier to extend adjacent cans carried therein.

22. The invention as defined in claim 20 and including means formed in an end panel for defining a finger grip to facilitate carrying the carrier.

References Cited

UNITED STATES PATENTS

| | | | |
|---|---|---|---|
| 2,722,365 | 11/1955 | Phipps | 229—40 |
| 3,081,928 | 3/1963 | Chidsey et al. | 229—40 |
| 3,119,546 | 1/1964 | Wuerthner | 229—40 |
| 3,223,308 | 12/1965 | Weiss | 229—40 |

THERON E. CONDON, *Primary Examiner.*

F. T. GARRETT, *Examiner.*

J. B. MARBERT, *Assistant Examiner.*